United States Patent
Galvão et al.

(10) Patent No.: US 11,685,517 B2
(45) Date of Patent: Jun. 27, 2023

(54) ACTUATOR MECHANISM FOR CONTROL SURFACE MASS BALANCE ALLEVIATION

(71) Applicant: EMBRAER S.A., São José dos Campos (BR)

(72) Inventors: Marcelo Galvão, São José dos Campos (BR); Rodolfo de Souza Martins, São José dos Campos (BR)

(73) Assignee: Embraer S.A., São José dos Campos-SP (BR)

( * ) Notice: Subject to any disclaimer, the term of this patent is extended or adjusted under 35 U.S.C. 154(b) by 13 days.

(21) Appl. No.: 17/399,581

(22) Filed: Aug. 11, 2021

(65) Prior Publication Data
US 2022/0055737 A1    Feb. 24, 2022

Related U.S. Application Data

(60) Provisional application No. 63/069,525, filed on Aug. 24, 2020.

(51) Int. Cl.
| | | |
|---|---|---|
| *B64C 17/02* | (2006.01) | |
| *B64C 3/38* | (2006.01) | |
| *B64C 9/02* | (2006.01) | |
| *B64C 13/28* | (2006.01) | |

(52) U.S. Cl.
CPC ............... *B64C 17/02* (2013.01); *B64C 3/38* (2013.01); *B64C 9/02* (2013.01); *B64C 13/28* (2013.01)

(58) Field of Classification Search
CPC .. B64C 17/02; B64C 3/38; B64C 9/02; B64C 13/28; B64C 13/34; B64C 3/48
See application file for complete search history.

(56) References Cited

U.S. PATENT DOCUMENTS

| | | | |
|---|---|---|---|
| 1,631,259 A * | 6/1927 | Gilmore | ................... B64C 3/48 244/214 |
| 4,595,158 A | 6/1986 | Robinson | |
| 4,838,503 A * | 6/1989 | Williams | ................ B64C 13/34 244/214 |
| 2011/0210210 A1* | 9/2011 | Lebrun | .............. B64D 45/0005 244/194 |

(Continued)

FOREIGN PATENT DOCUMENTS

| | | |
|---|---|---|
| CN | 110562437 A | 12/2019 |
| WO | 2016094527 A1 | 6/2016 |

OTHER PUBLICATIONS

Livne, Aircraft Active Flutter Suppression: State of the Art and Technology Maturation Needs, Journal Of Aircraft, vol. 55, No. 1 (Jan.-Feb. 2018) (41 pages).

(Continued)

*Primary Examiner* — Rodney A Bonnette
(74) *Attorney, Agent, or Firm* — Nixon & Vanderhye P.C.

(57) ABSTRACT

Installation of powered actuators in the leading edge of a control surface in order to have a better weight distribution. The systems described herein propose an actuation system with a static ground structure used to move a control surface of an aircraft. The actuation system, and the ground structure are aligned with the center of rotation of the control surface, providing the aircraft with flutter suppression. This proposal is an approach to use the actuator in a place favorable to the mass balancing and reducing or even dismissing the usage of mass balancing, saving weight and cost.

9 Claims, 5 Drawing Sheets

(56) References Cited

U.S. PATENT DOCUMENTS

| | | | | |
|---|---|---|---|---|
| 2015/0166172 | A1* | 6/2015 | Kirn | B64C 3/48 |
| | | | | 244/99.2 |
| 2016/0009372 | A1* | 1/2016 | Grip | B64C 9/24 |
| | | | | 244/214 |
| 2019/0176963 | A1* | 6/2019 | Hsueh | B64C 13/34 |
| 2020/0094946 | A1 | 3/2020 | Bezivin et al. | |
| 2020/0198769 | A1* | 6/2020 | Miyazono | B64C 13/50 |
| 2020/0369373 | A1* | 11/2020 | Vadlejch | B64C 13/505 |
| 2021/0323656 | A1* | 10/2021 | Shmilovich | B64C 3/26 |

OTHER PUBLICATIONS

Extended European Search Report issued in European U.S. Appl. No. 21192401.4 dated Jan. 21, 2022 (14 pages).

* cited by examiner

ACTUATOR MECHANISM FOR CONTROL SURFACE MASS BALANCE ALLEVIATION

CROSS-REFERENCE TO RELATED APPLICATION

The present application claims benefit of 63/069,525 filed Aug. 24, 2020, which is incorporated herein by reference in its entirety and for all purposes.

FIELD

The technology herein relates a complete solution for a control surface mechanism arrangement in order to improve control surface gravity center distribution. In more detail, the solution described herein relates to and provides a proposal for arranging an actuator in such a manner as to contribute favorably for control surface mass balance.

BACKGROUND & SUMMARY

Throughout aeronautical industry history, flutter suppression has been a mandatory requirement in aircraft flight controls projects. Fluttering is the phenomena observed when vibrations occurring in a structure of the aircraft match the natural or resonant frequency of the structure. Such fluttering conditions can cause undamped resonant vibrations to build, damaging or possibly destroying the structure. Mitigating fluttering is an important requirement as it can lead to structural damage or failure if not addressed properly.

There are generally two types of control surface flutter: continuous flutter and divergent flutter. Continuous flutter is caused by the control surfaces and the appendages to which they are connected engaging in a mutually reinforced harmonic vibration. Adding counter-balance weights to the control surfaces can dampen this kind of flutter oscillations. Divergent flutter causes a resonance that can generate vibrations at exponentially increasing amplitude, and typically is addressed at the structure design stage. See e.g., Livne, Aircraft Active Flutter Suppression: State of the Art and Technology Maturation Needs, Journal Of Aircraft, Vol. 55, No. 1, (January-February 2018), incorporated herein by reference.

There are generally two manners of being compliant with flutter suppression requirements: one is by providing a dynamic damping and stiffness mechanism, and the second is by balancing the control surface in order to make it stable in a flutter condition.

The first option is the most used in Fly-by-Wire (FBW) aircrafts, usually using powered hydraulic actuators. The construction of such a powered hydraulic actuator device is favorable for use in two modes: Active and Damped. A mode select valve connects the actuator's chambers to an Electrohydraulic Servo Valve (EHSV) or to a damping chamber, where the passive failed state is in the position of Mode Select Valve (MSV) to the damped mode. This is an advantageous solution since the implementation of such functionalities do not require many modifications over the complexity of the hydraulic actuator, and the same actuator mechanism that is used to position and move a control surface or other aircraft structure also supplies damping to reduce flutter. However, because the flutter damping effectiveness of such actuators cannot be reliably determined in typical visual inspections, some precautions must be taken in order to prevent dormant failures, and many complex built in tests must be applied to the system.

In some aircraft types, it may not be feasible to use hydraulic actuators due to the limitations in capacity of the hydraulic system. Therefore, an electric actuator is a viable option. Using the same approach of hydraulic actuators for flutter suppression, electromechanical actuators can be used as dampers, by shortening their coils and using back Electro-Magnetic Field (EMF) effects to provide damping. The main problem of using electromechanical actuators as dampers, is the need for the actuators to also comply with the backlash requirements, which are very tight.

For this reason, it may require severe efforts to accomplish safety requirements and demands complex periodic maintenance tasks, such as backlash testing.

The use of mass balancing has the advantage of eliminating many design concerns regarding flutter suppression, periodic maintenance tasks and built in tests. On the other hand, adding balancing masses requires the aircraft to carry a lot of extra weight.

The solution proposed here is focused in an optimization of the mass balancing solution. Currently, the most popular solution for powered control surface mechanisms is to fix one rod end of the actuator on the aircraft structure and the other rod end on the control surface. Some rotary actuators also can be installed in the hinge line of a control surface (e.g., flaps, rudder, etc.), making a direct connection to the control surface. In both cases there in the past has been only one function provided: empowering the control surface to make the aircraft easier to maneuver.

Moving the actuator installation to the control surface's leading edge, is a solution where the actuator's mass will contribute to the gravity center travel favorable for reducing or even eliminating the use of additional mass balancing. Many mechanisms can be used for this implementation. Non-limiting embodiments of the technology will be described herein with the intention of demonstrating the feasibility of such solutions.

The nature of this solution provides weight reduction by allocating powered actuators in the leading edge of a control surface. The installation of the actuator in this position is prone to moving the center of gravity (CG) of the control surface forward from where it would otherwise have been. This diminishes the need to add additional mass in order to balance the control surface.

A variety of mechanism solutions can be adopted in order to connect the actuator to aircraft structure to make the control surface spin around its hinge line.

The arrangement of the actuators will vary according to the designer's decisions, however actuator positions on the control surface leading edge are intended to balance weight reduction.

Example of non-limiting features and/or advantages include:
  Diminish weight due to favorable center of gravity allocation of control surfaces;
  Dismiss or obviate several built in test and maintenance tasks in order to reveal dormant failures;
  All advantages of using mass balancing solutions without adding extra weight to the aircraft; and
  Part of actuator support structure will also be assembled in the leading edge of the control surface, which will also provide a better mass balance.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE NON-LIMITING EMBODIMENTS

Figure 1:
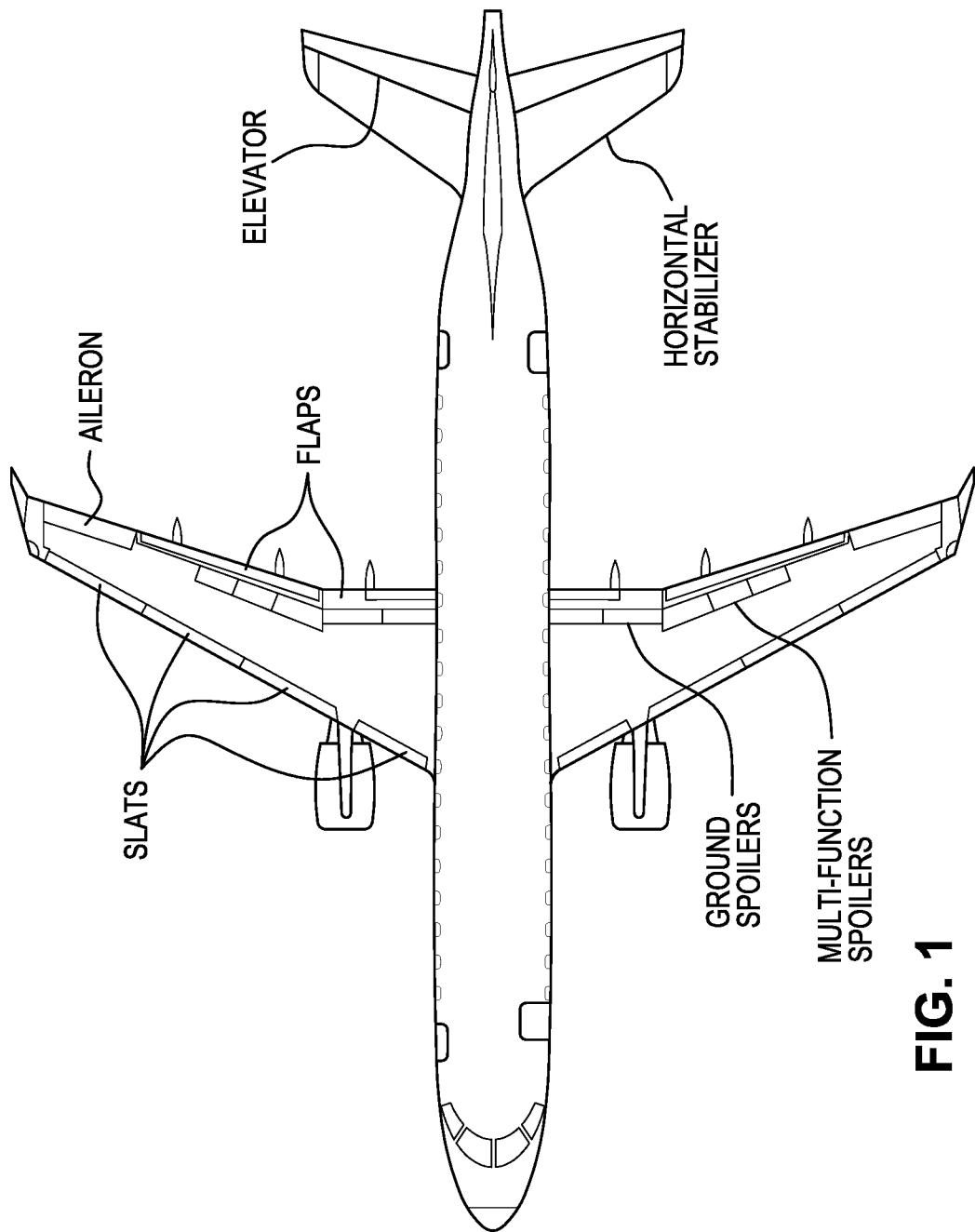
FIG. 1 shows an example aircraft including control surfaces.
Figure 2:
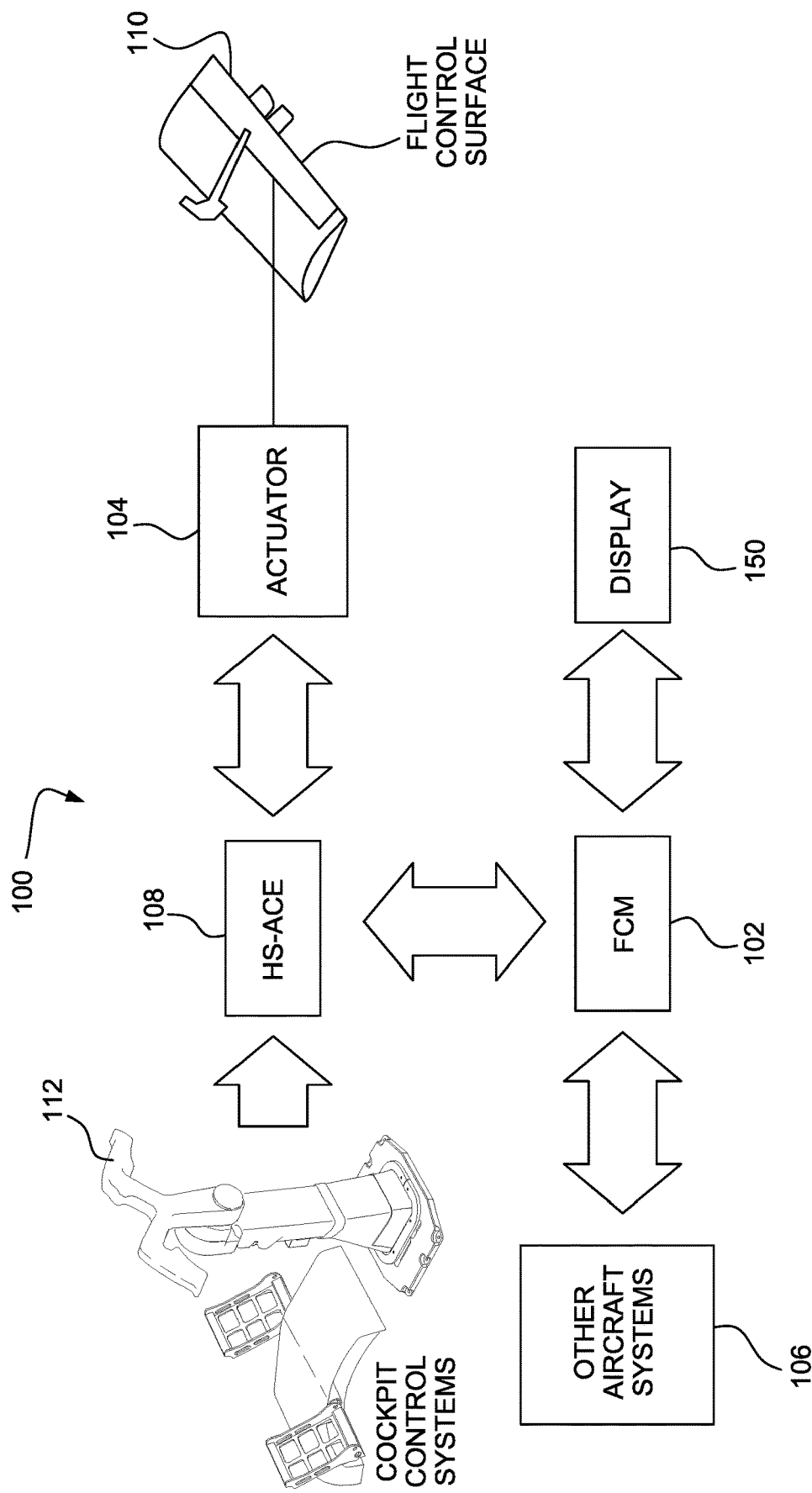
FIG. 2 shows an example fly-by-wire control system.

A typical aircraft as shown in FIG. 1 includes a fly-by-wire (FBW) system as shown in FIG. 2. In such an example system 100, the flight control module processor (FCM) 102 receives inputs from cockpit control systems 112 (e.g., including the yoke or other inceptor) and other aircraft systems 106 such as sensor outputs including calibrated air speed and stored values such as load factor, and provides outputs to a fly-by-wire (FBW) system including HS-ACE (horizontal stabilizer actuator control electronics) 108. The FCM 102 executes program code instructions stored in a non-transitory memory that generate, in response to such inputs, electronic control signals that the FCM provides via HS-ACE 108 to an actuator 104 such as an electric motor and/or a hydraulic actuator. In this particular example, the cockpit control systems 112 may also provide inputs directly to HS-ACE 104. When active, the actuator 104 changes the position of controls surfaces 110 based on the control signals it receives from the FCM processor 102 via the HS-ACE 108. As the inputs change, the FCM 102 uses a control law to update the control signals which causes the actuators 104 to change the position of the flight control surfaces 110, thereby adapting the pitch of the aircraft to the changing inputs including pilot control inputs 112 and other inputs relating to the aircraft flight environment, the current state of the aircraft (including weight amount and distribution) and the like.

Aircraft control surfaces such as flaps, ailerons, elevators, rudders, trim tabs, horizontal stabilizers, etc. (see FIG. 1) demand a design that provides a high level of integrity over the flutter suppression. A balanced control surface has the advantage of being a passive solution, where the position of its center of gravity (CG) is a stable structure for flutter conditions. Moreover, this solution has much less dormant failure than a damped design. In the proposed solution, the actuator is located in the leading edge of the control surface. This configuration is favorable for mass balance of the control surface.

Figure 3:
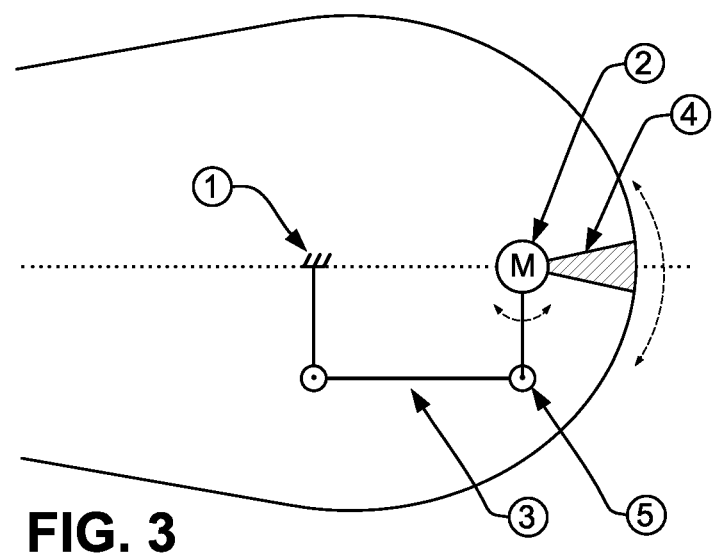
FIG. 3 is a non-limiting embodiment of an example four bar control surface actuation system.

In one embodiment, the control actuation system of FIG. 3 is comprised of a rotary actuator (2), a surface fixation or anchor (4), and a rod (3) which connects the actuator to a tube fixed in the hinge line and grounded to a vertical empennage (1). In this arrangement, the relation from actuator rotation to surface rotation is one-to-one (i.e., each angle degree of rotation of the actuator (2) causes the control surface to rotate by one degree in the same direction), but the bars can be dimensioned as desired to provide different proportionality to achieve project requirements. In one embodiment, the actuator (2) mechanism will control only the control surface and there is no dynamic on the proposal that the mechanism will control the CG. The way we are proposing to install the actuator (2) and other associated part(s) such as linkages, is prone to bringing the CG of the control surface on the way to the leading edge of the control surface.

In one embodiment, actuator (2) may comprise one or more linear electromechanical actuators. One type of such linear electromechanical actuators typically uses one or two electric motors to drive a linear screw or a rotary arm that is capable of moving the applicable control surface and holding the required position. Such electromechanical actuators can be controlled using control currents to provide a desired degree of damping.

Figure 4:
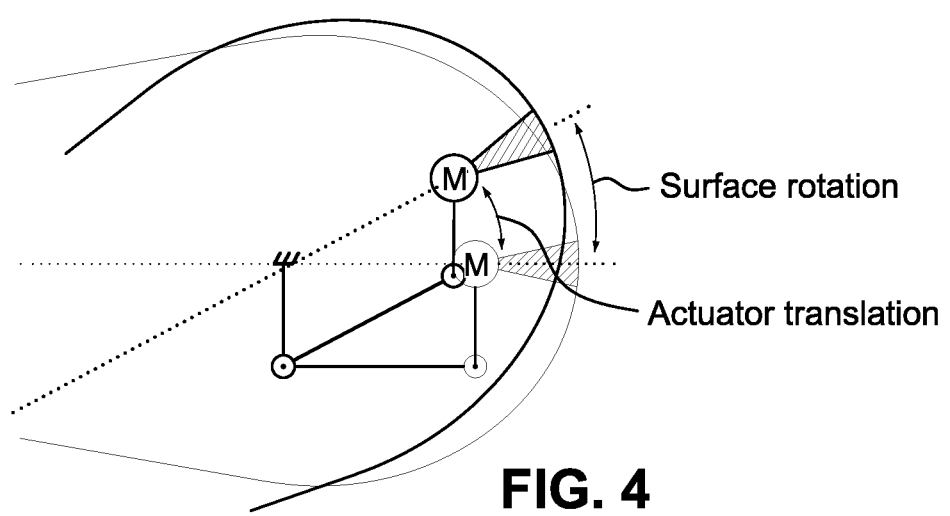
FIG. 4 illustrates the FIG. 3 mechanism arrangement after actuation.

FIG. 4 illustrates how the load is transmitted when the actuator (2) rotates its arm which compresses the rod (3). The rod (3) transmits, through the ball bearings (5) or other pivot points, the load to the grounded structure (1) which leads to surface rotation and actuator translation.

Figure 5:
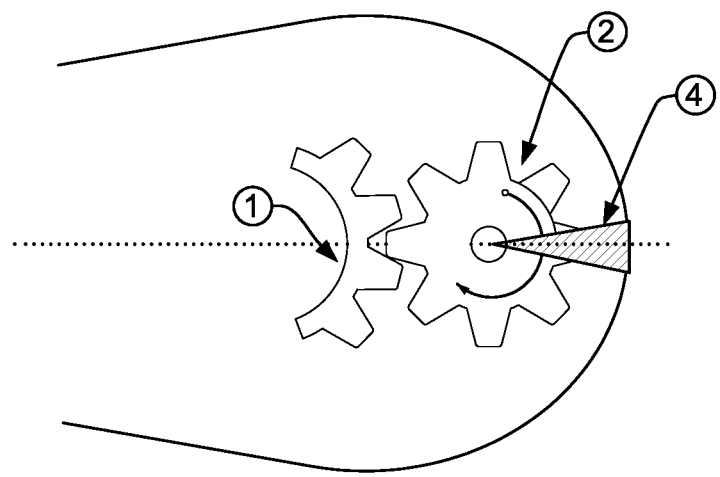
FIG. 5 shows a rack and pinion arrangement between the actuator pinion (2) and the ground structure rack (1). This solution has its own challenges, such as the exposure of the mechanism could easily lead to a jam.

FIG. 5 shows an example rotary actuator including a rack and pinion arrangement between the actuator pinion (2) and the ground structure rack (1). In one embodiment, the pinion is directly on the axis of rotary actuator. Rotary actuators are not limited to the 90° pivot arc typical of cylinders; they can achieve arc lengths of 180°, 360°, or even 720° or more, depending on the configuration. This solution has its own challenges (for example, such a mechanism could easily lead to a jam) but it may be successful in some implementations.

Figure 6:
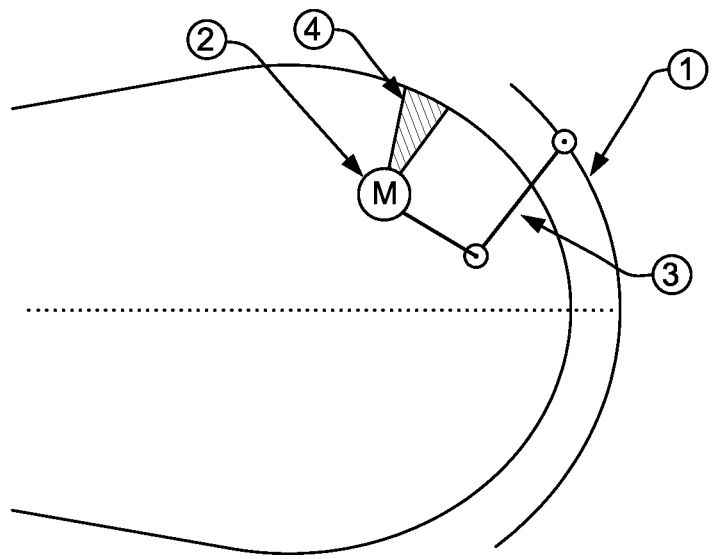
FIG. 6 shows a direct connection from the actuator (2) and the vertical empennage (1) through the rod (3). This solution eliminates the need for a ground structure overrunning inside the control surface.

FIG. 6 shows a direct connection from the actuator (2) and the vertical empennage (1) through the rod (3). This solution eliminates the need for a ground structure overrunning inside the control surface.

Figure 7:
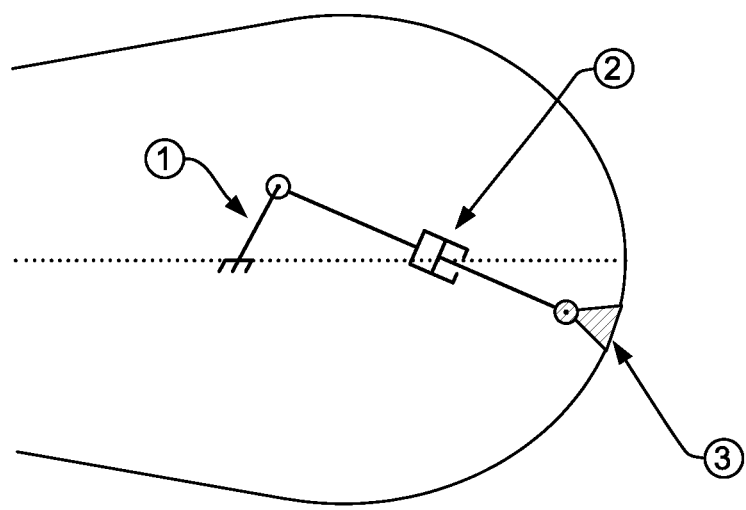
FIG. 7 shows use of a linear actuator (2) directly connected on the ground structure (1).

FIG. 7 shows a use of a linear actuator (2) directly connected on the ground structure (1).

Acronyms and Abbreviations

CG Center of Gravity
EHSV Electro-Hydraulic Servo Valve
EMF Electromotive Force
FBW Fly-By-Wire
MSV Mode Select Valve

The invention claimed is:

1. A control surface system comprising:
a control surface having a leading edge and a center of rotation, and
a control surface actuation system comprising:
an electromechanical actuator installed inside the control surface and located in the leading edge of the control surface; and
a ground structure, coupled to the actuator, aligned with a center of rotation of the control surface;
wherein a mass balance of the control surface is provided by the electromechanical actuator located in the leading edge of the control surface.

2. The system of claim 1, wherein the control surface actuation system is coupled to a control surface fixation.

3. The system of claim 1, wherein the electromechanical actuator comprises a linear or rotary actuator.

4. The system of claim 1, wherein the actuator is configured to move the control surface proportionally to an amount the actuator moves.

5. The system of claim 1
wherein the actuator translates with control surface rotation.

6. An aircraft comprising:
a control surface having a leading edge and a center of rotation;
an electromechanical actuator installed inside the control surface and disposed in the leading edge of the control surface; and
a ground structure, mechanically coupled to the actuator wherein a mass balance of the control surface is provided by the electromechanical actuator disposed in the leading edge of the control surface.

7. The aircraft of claim 6, wherein the electromechanical actuator is coupled to a control surface fixation.

8. The aircraft of claim 6, wherein the electromechanical actuator comprises a linear or rotary actuator.

9. The aircraft of claim 6, wherein the actuator is configured to move the control surface proportionally to an amount the actuator moves.

\* \* \* \* \*